(12) United States Patent
Dobson, Sr. et al.

(10) Patent No.: US 7,060,661 B2
(45) Date of Patent: Jun. 13, 2006

(54) ACID THICKENERS AND USES THEREOF

(75) Inventors: Randy Ezell Dobson, Sr., Spring, TX (US); David Kelly Moss, Putnam Valley, NY (US); Raman Sarasamma Premachandran, Saddlebrook, NJ (US)

(73) Assignee: Akzo Nobel N.V., Arnhem (NL)

( * ) Notice: Subject to any disclaimer, the term of this patent is extended or adjusted under 35 U.S.C. 154(b) by 166 days.

(21) Appl. No.: 10/157,565

(22) Filed: May 29, 2002

(65) Prior Publication Data

US 2002/0147114 A1 Oct. 10, 2002

Related U.S. Application Data

(63) Continuation-in-part of application No. 09/553,196, filed on Apr. 20, 2000, now Pat. No. 6,506,710, which is a continuation-in-part of application No. 08/995,275, filed on Dec. 19, 1997, now Pat. No. 6,239,183.

(60) Provisional application No. 60/376,295, filed on Apr. 29, 2002.

(51) Int. Cl.
C09K 8/68 (2006.01)

(52) U.S. Cl. ............... 507/245; 507/242; 507/132; 507/922; 507/933; 510/433; 516/102; 166/307; 166/308.2

(58) Field of Classification Search ............... 507/245, 507/242, 132, 922, 933; 510/504, 433; 516/102; 166/307, 308, 308.2, 308.3
See application file for complete search history.

(56) References Cited

U.S. PATENT DOCUMENTS

| 4,107,328 | A | * | 8/1978 | Michaels | 514/556 |
|---|---|---|---|---|---|
| 4,587,030 | A | * | 5/1986 | Casey | 510/406 |
| 4,737,296 | A | * | 4/1988 | Watkins | 507/202 |
| 5,263,540 | A | | 11/1993 | Dovan et al. | 166/278 |
| 5,441,664 | A | | 8/1995 | Blanvalet et al. | 252/117 |
| 5,580,849 | A | * | 12/1996 | Dyet et al. | 510/427 |
| 5,678,632 | A | | 10/1997 | Moses et al. | 166/307 |
| 5,797,456 | A | | 8/1998 | Mokadam | 166/307 |
| 5,919,312 | A | * | 7/1999 | Wierenga et al. | 134/34 |
| 5,998,347 | A | | 12/1999 | D'Ambrogio et al. | 510/237 |
| 6,153,572 | A | | 11/2000 | Stamm | 510/193 |
| 6,239,183 | B1 | | 5/2001 | Farmer et al. | 516/102 |
| 6,244,343 | B1 | | 6/2001 | Brothers et al. | 166/293 |
| 6,277,803 | B1 | | 8/2001 | Tarng et al. | 510/237 |
| 6,306,800 | B1 | | 10/2001 | Samuel et al. | 507/129 |
| 6,313,084 | B1 | * | 11/2001 | D'Ambrogio et al. | 510/425 |
| 6,350,721 | B1 | | 2/2002 | Fu et al. | 507/242 |
| 6,399,799 | B1 | | 6/2002 | Pereira et al. | 554/52 |
| 6,645,912 | B1 | * | 11/2003 | Mille et al. | 504/206 |
| 6,703,352 | B1 | * | 3/2004 | Dahayanake et al. | 507/241 |

FOREIGN PATENT DOCUMENTS

| GB | 2 354 541 | 3/2001 |
|---|---|---|
| JP | 09003491 | 7/1997 |
| JP | 11152493 | 8/1999 |
| WO | WO 99/32572 | 7/1999 |
| WO | WO 00/17303 | 3/2000 |
| WO | WO 01//07010 | 2/2001 |
| WO | WO 01/30950 | 5/2001 |
| WO | WO 01/81499 | 11/2001 |

OTHER PUBLICATIONS

Derwent Abstract No.: 1999-389501/33 abstracting Japanese Patent No.: 11152493.
Derwent Abstract No.: 97-121870/12 abstracting Japanese Patent No.: 09003491.
International Search Report, No.: PCT/EP03/04191, Aug. 1, 2003.

* cited by examiner

Primary Examiner—Philip C. Tucker
(74) Attorney, Agent, or Firm—Ralph J. Mancini

(57) ABSTRACT

The present invention generally relates to aqueous, acidic compositions thickened with an amidoamine oxide gelling agent and/or viscoelastic surfactant of the general formula I:

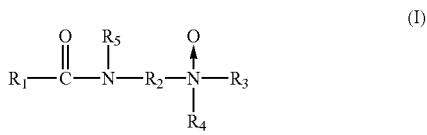

wherein $R_1$ is a saturated or unsaturated, straight or branched chain aliphatic group of from about 7 to about 30 carbon atoms, $R_2$ is a divalent alkylene group of 2–6 carbon atoms which may be linear or branched, substituted or unsubstituted, and $R_3$ and $R_4$ are independently $C_1$–$C_4$ alkyl or hydroxyalkyl groups or together they form a heterocyclic ring of up to six members, and $R_5$ is hydrogen or a $C_1$–$C_4$ alkyl or hydroxyalkyl group. The aforementioned gelling agents advantageously provide gels that do not undergo phase separation over extended periods of time and exhibit high heat stability. The thickened acid gels of the invention have applications in household and industrial cleaners and degreasers, oilfield stimulation applications and the like.

29 Claims, No Drawings

ACID THICKENERS AND USES THEREOF

The present application claims priority of U.S. Provisional Patent Application Ser. No. 60/376,295, filed on Apr. 29, 2002 and is a Continuation In Part application of U.S. Ser. No. 09/553,196, filed on Apr. 20, 2000, now U.S. Pat. No. 6,506,710, which is a Continuation In Part application of U.S. Ser. No. 08/995,275, filed Dec. 19, 1997, now U.S. Pat. No. 6,239,183.

FIELD OF THE INVENTION

The present invention generally relates to thickened acid gels and uses thereof.

BACKGROUND OF THE INVENTION

The present invention generally relates to thickened acid gels and uses for such thickened gels. For example, acid thickened solutions can be usefully employed in cleaning formulations such as hard surface cleaners, toilet bowl cleaners, industrial cleaners, and the like and in oilfield applications such as well stimulation. These and other uses will be apparent to the skilled artisan.

The compositions of the present invention are particularly useful in oilfield applications. Hydrocarbons are obtained by drilling a well that penetrates a subterranean hydrocarbon-bearing formation providing a partial flowpath for the oil to reach the surface. In order for oil travel from the formation to the wellbore there must be a flowpath from the formation to the wellbore. This flowpath is through the formation rock and has pores of sufficient size and number to allow a conduit for the oil to move through the formation.

A common reason for a decline in oil production is damage to the formation that plugs the rock pores and impedes the flow of oil to the wellbore and ultimately to the surface. This damage generally arises from deliberately injecting another fluid into the wellbore. Even after drilling, some drilling fluid remains in the region of the formation near the wellbore, which may dehydrate and form a coating on the wellbore. The natural effect of this coating is to decrease the permeability to oil moving from the formation in the direction of the wellbore.

Another reason for a decline in oil production occurs when the pores of the formation are small in size such that oil migrates toward the wellbore only very slowly. In both circumstances, it is desirable to improve the low permeability of the formation.

Well stimulation refers to the various techniques employed to improve the permeability of a hydrocarbon-bearing formation. Three general well-stimulation techniques are typically employed. The first involves injecting chemicals into the wellbore to react with and dissolve permeability damaging materials such as wellbore coatings. A second method requires injecting chemicals through the wellbore and into the formation to react with and dissolve small portions of the formation thereby creating alternative flowpaths for the hydrocarbons to flow to the wellbore. These alternative flow paths redirect the flow of oil around the low permeability or damaged areas of the formation. A third technique, often referred to as fracturing, involves injecting chemicals into the formation at pressures sufficient to actually fracture the formation, thereby creating a large flow channel though which hydrocarbon can more readily move from the formation and into the wellbore.

In one embodiment, the present invention is directed to methods to enhance the productivity of hydrocarbon bearing formations by removing near-wellbore formation damage or by creating alternate flowpaths by dissolving small portions of the formation. This is conventionally known as matrix acidizing. In this technique, acids, or acid-based fluids, are useful in this regard due to their ability to dissolve both formation minerals and contaminants which were introduced into the wellbore/formation during drilling or remedial operations. The primary fluids used in acid treatments are mineral acids such as hydrochloric acid which is still the preferred acid treatment in carbonate formations. For sandstone formations, the preferred fluid is a hydrochloric/hydrofluoric acid mixture.

The purpose of an acid treatment is to remove formation damage along as much of the hydrocarbon flow path as possible. An effective treatment must therefore remove as much damage as possible along the entire flow path. The fluids and techniques of the present invention allow maximum penetration of the acid resulting in a more effective treatment.

The thickened acid viscoelastic fluids of the present application also have applications in hydraulic fracturing, in gravel packing and in other well stimulation techniques known to one of ordinary skill in the art. Additionally, the acid thickened fluids of the present invention can usefully be employed in various household and industrial cleaners including, but not limited to, detergent compositions, toilet bowl cleaners, hard surface cleaners, grease cutting compositions, and the like.

SUMMARY OF THE INVENTION

The present invention generally relates to aqueous, viscoelastic acidic compositions thickened with an amidoamine oxide gelling agent and/or viscoelastic surfactant of the general formula I:

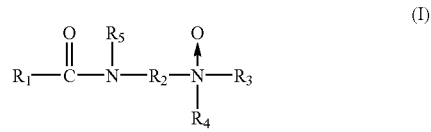

wherein $R_1$ is a saturated or unsaturated, straight or branched chain aliphatic group of from about 7 to about 30 carbon atoms, $R_2$ is a divalent alkylene group of 2–6 carbon atoms which may be linear or branched, substituted or unsubstituted, and $R_3$ and $R_4$ are independently $C_1$–$C_4$ alkyl or hydroxyalkyl groups or together they form a heterocyclic ring of up to six members, and $R_5$ is hydrogen or a $C_1$–$C_4$ alkyl or hydroxyalkyl group.

The aforementioned gelling agents advantageously provide gels that do not undergo phase separation over extended periods of time and exhibit high heat stability. The thickened acid gels of the invention have applications in household and industrial cleaners and degreasers, oilfield stimulation applications and the like.

DETAILED DESCRIPTION OF THE INVENTION

The present invention generally relates to a viscoelastic acid composition, to gelling agent for acidic solutions, and to methods of using said gelled acid composition. The thickened acid composition of the present invention can usefully be employed in methods of stimulating and/or modifying the permeability of underground formations, in drilling fluids, completion fluids, workover fluids, acidizing fluids, gravel packing and the like. Additionally, the acid thickened compositions of the present invention can also be employed in cleaning formulations, water-based coatings, detergent formulations, personal care formulations, water based asphalt formulations and the like.

In one embodiment, the invention relates to an aqueous, thickened acid gel which comprises acid and a gelling agent. Any known acid can be employed, including, but not limited to, mineral acids, organic acids, and the like. Examples of not limited to hydrochloric, hydrofluoric, acetic, formic, sulfamic, chloroacetic, mixtures thereof and the like. Aqueous acid thickened compositions of the present invention can be obtained by adding one or more gelling agents to an aqueous, acid solutions as described below. The concentration of gelling agent in the aqueous composition is generally in the range of from about 0.5% to about 10% by weight, preferably from about 2% to about 8% by weight, and more preferably from about 4% to about 6% by weight based on the total weight of the composition. The aqueous composition of the invention can include inorganic salts and various additives as described hereinbelow.

The gelling agents disclosed and described herein are surfactants that can be added singly or they can be used as a primary component in the aqueous, thickened acid compositions of the present invention.

The gelling agent composition of the present invention comprises at least one glycol and at least one amidoamine oxide having the structure

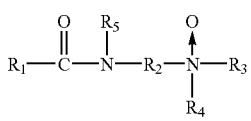

(I)

wherein $R_1$ is a saturated or unsaturated, straight or branched chain aliphatic group of from about 7 to about 30 carbon atoms, preferably from about 14 to about 21 carbon atoms. More preferably, $R_1$ is a fatty aliphatic derived from natural fats or oils having an iodine value of from about 1 to about 140, preferably from about 30 to about 90, and more preferably from 40 to about 70. $R_1$ may be restricted to a single chain length or may be of mixed chain length such as those groups derived from natural fats and oils or petroleum stocks. Preferred are tallow alkyl, hardened tallow alkyl, rapeseed alkyl, hardened rapeseed alkyl, tall oil alkyl, hardened tall oil alkyl, coco alkyl, oleyl, or soya alkyl. $R_2$ is a straight chain or branched, substituted or unsubstituted divalent alkylene group of from 2 to about 6 carbon atoms, preferably, of 2 to 4 carbon atoms and more preferably of 3 carbon atoms. $R_3$ and $R_4$ are the same or different and are selected from alkyl or hydroxyalkyl groups of from 1 to about 4 carbon atoms and are preferably hydroxyethyl or methyl. Alternatively, $R_3$ and $R_4$ in the amido amine oxide of formula I together with the nitrogen atom to which these groups are bonded form a heterocyclic ring of up to 6 members. Finally, $R_5$ is hydrogen or a $C_1$-$C_4$ alkyl or hydroxyalkyl group. Illustrative of these amidoamine oxides are those derived from:

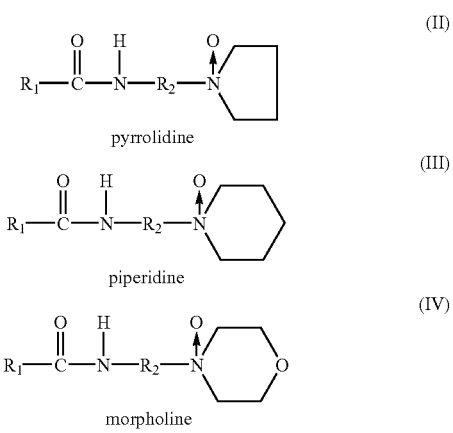

pyrrolidine (II)

piperidine (III)

morpholine (IV)

Other examples of amidoamine oxides contemplated by the present invention include but are not limited to those selected from the group consisting of tallow amidoalkylamine oxide, hardened tallow amidoalkylamine oxide, rapeseed amidoalkylamine oxide, hardened rapeseed amidoalkylamine oxide, tall oil amidoalkylamine oxide, hardened tall oil amidoalkylamine oxide, coco amidoalkylamine oxide, stearyl amidoalkylamine oxide, oleyl amidoalkylamine oxide, soya amidoalkylamine oxide, and mixtures thereof. Preferred specific examples of the amidoamine oxides of the present invention include but are not limited by the following: tallowamidopropyl dimethylamine oxide, hydrogenated tallowamidopropyl dimethylamine oxide, soya amidopropyl dimethylamine oxide, oleyl amidopropyl dimethylamine oxide, erucyl amidopropyl dimethylamine oxide, rapeseed amidopropyl dimethylamine oxide, hydrogenated rapeseed amidopropyl dimethylamine oxide, tall oil amidopropyl dimethylamine oxide, hydrogenated tall oil amidopropyl dimethylamine oxide, $C_{14}$-$C_{22}$ saturated or unsaturated fatty acid amidopropyl dimethylamine oxides, and mixtures thereof.

The amine oxide gelling agent composition can be prepared by reacting a tertiary amine, for example, a tertiary amidoamine, with a concentrated hydrogen peroxide in a miscible glycol as a solvent. The amount of glycol to be added is determined by the concentration of the amine oxide solution to be prepared.

The glycols employed are high flash point solvents that solubilize the tertiary amine, amine oxide and water from the hydrogen peroxide reagent. If water is used as the solvent, the result is a gel/paste with a maximum amine oxide concentration of 20–30%. If one were to employ an alcohol such as isopropanol as a solvent, then the product will have a low flash point and will have to be classified as a flammable. Also, alcohols such as isopropanol appear to modify the structure of the surfactant aggregates formed thereby negatively affecting the ability of the amine oxide solution to thicken solutions. The use of glycols in accordance with the present invention overcomes the disadvantages of the prior art and allows for the preparation of concentrated amine oxide viscoelastic compositions having a superior thickening ability.

In the alternative, the amine oxide gelling agent composition can be prepared by reacting a tertiary amine with a concentrated hydrogen peroxide in an alcohol solvent such as isopropanol but, as mentioned above, since alcohol solvents such as isopropanol may have a deleterious effect on the performance of the gelling agent, it is preferred that the alcohol be removed from the final product and replaced with a glycol solvent.

Although any glycol solvent can be employed in accordance with the present invention, the most preferred glycols include but are not limited to ethylene glycol, butylene glycols, diethylene glycol, polypropylene glycol, polyethylene glycol, glycerin, propylene glycols, tetramethylene glycol, tetramethylethylene glycol, trimethylene glycol, and the like. Propylene glycols (e.g., 1,2 propanediol) are the most preferred glycols.

It is also important to minimize the amount of free fatty acid formed since free fatty acid may be harmful to the gelling agents. More specifically, the gelling agents in accordance with the present invention give greater viscosity to an aqueous solution if the amine oxide has less than 10% free fatty acid, preferably less than 5% free fatty acid, preferably less than 3% free fatty acid, and most preferably, less than 1% free fatty acid. In order to achieve these low levels of free fatty acid, it is important to utilize an oxidation catalyst in the aforementioned process for preparing the gelling agents of the present invention. Preferred oxidation catalysts include, but are not limited to dissolved carbon dioxide, a carbonate salt, a bicarbonate salt and the like. Catalyst systems such as this are described in U.S. Pat. No. 4,960,934 which is incorporated herein by reference.

A sequesterant may also be employed to stabilize the product at higher temperatures during storage. A preferred sequesterant is a phosphonate salt, such as the phosphonate salts sold by Solutia™ under the trade name of Dequest®. A preferred product is Dequest® 2010. The sequestrant can be added either during the process for making the gelling agent composition of the present invention or at any point thereafter.

The gelling agent composition gives greater viscosity to an aqueous, acid solution if the amine oxide contains less than 10%, but greater than 0.5% free amine, preferably between 8% and 2% free amine, and most preferably between about 6% and 3% free amine.

The concentration of gelling agent composition preferably ranges from about 1% to about 10% depending on the desired viscosity, more preferably about 3% to 8%, and most preferably about 4% to about 6%.

The gelling agents of the present invention have been shown to effectively thicken HCl acid solutions of 3–15%.

The compositions of the present invention can also contain inorganic salts (e.g., brines which contain alkali metal salts, alkaline earth metal salts, and/or ammonium salts), and other viscosity modifying additives (e.g., such as cellulosics). Brines gelled with such agents are advantageously used as water diversion agents, pusher fluids, fracture fluids, drilling muds, gravel-packing fluids, drill-in fluids, workover fluids, completion fluids, and the like.

The gelled acid compositions of the present invention can also be utilized in cleaning and sanitizing formulations, water-based coatings (e.g. paints), detergent formulations, personal care formulations, water-based asphalt systems, concrete, building products, (e.g., motars, plasters, joint compounds, and the like), agricultural drift control agents, in oil well stimulation applications and the like.

When used in stimulation applications, the thickened acid gel of the present invention can optionally include lubricants, corrosion inhibitors and various other additives.

Lubricants can include metal or amine salts of an organo sulfur, phosphorus, boron or carboxylic acid. Typical of such salts are carboxylic acids of 1 to 22 carbon atoms including both aromatic and aliphatic acids; sulfur acids such as alkyl and aromatic sulfonic acids and the like; phosphorus acids such as phosphoric acid, phosphorous acid, phosphinic acid, acid phosphate esters, and analogous sulfur homologs such as the thiophosphoric and dithiophosphoric acid and related acid esters; mercaptobenzothiozole; boron acids including boric acid, acid borates and the like; and lauric acid amine salts.

Corrosion inhibitors can include alkali metal nitrites, nitrates, phosphates, silicates and benzoates. Representative suitable organic inhibitors include hydrocarbyl amine and hydroxy-substituted hydrocarbyl amine neutralized acid compound, such as neutralized phosphates and hydrocarbyl phosphate esters, neutralized fatty acids (e.g., those having 8 to about 22 carbon atoms), neutralized aromatic carboxylic acids (e.g., 4-(t-butyl)-benzoic acid), neutralized naphthenic acids and neutralized hydrocarbyl sulfonates. Mixed salt esters of alkylated succinimides are also useful. Corrosion inhibitors can also include the alkanolamines such as ethanolamine, diethanolamine, triethanolamine and the corresponding propanolamines as well as morpholine, ethylenediamine, N,N-diethylethanolamine, alpha- and gamma-picoline, piperazine and isopropylaminoethanol.

Stimulation fluids can also include additives for specific applications to optimize the performance of the fluid. Examples include colorants; dyes; deodorants such as citronella; bactericides and other antimicrobials; chelating agents such as an ethylene diamine tetraacetate sodium salt or nitrilo triacetic acid; anti-freeze agents such as ethylene glycol and analogous polyoxyalkylene polyols; anti-foamants such as silicone-containing agents and shear stabilizing agents such as commercially available polyoxyalkylene polyols. Anti-wear agents, friction modifiers, anti-slip and lubricity agents may also be added. Also included are extreme pressure additives such as phosphate esters and zinc dialkyl dithiophosphate.

The thickened acid gels disclosed and described herein can advantageously be employed as an acidizing fluid. A major portion of the world's hydrocarbon reserves are found in carbonate rock structures which are known to have very low permeability. In many sandstone reservoirs, the rock structure may be cemented together by carbonate, or carbonate scales may accumulate close to production wells as a result of carbon dioxide being released from solution due to a pressure drop. Another type of scale that can accumulate around production wells is iron scale, in particular iron oxides and hydroxides. Low permeability, drilling damage and accumulation of scale all impede the flow of oil to the production well and the conventional method used to open up channels around the well bore to improve the flow rate is the injection of acid known as acidizing or acid stimulation.

There are two types of acid treatment: fracture acidizing, i.e., injection of acid at rates above fracture pressure to etch the faces of the resultant fractures and matrix acidizing where the injection of acid is at rates below fracture pressure to dissolve flow channels in the rock or to remove scale or damage caused by drilling. Acid treatments are employed in all types of oil wells and occasionally in water wells: they may be used to open fractures or remove damage in newly drilled wells or to rehabilitate old wells from which production has declined. Acid is pumped into the well, where it reacts with the calcium carbonate according to the following reaction:

$$CaCO_3 + 2HCl \rightarrow CaCl_2 + CO_2 + H_2O$$

Calcium chloride ($CaCl_2$) is highly soluble in water and the acid etches channels in the rock, thus improving the oil or gas flow towards the production well. Hydrochloric acid reacts immediately with carbonate rock and tends to form a few large channels known as "wormholes" through the rock, rather than opening up the pore structure. The acid penetration distance is limited to a few feet at most.

Because hydrochloric acid reacts so rapidly when contacted with carbonate rock, a number of products have been developed which aim to reduce the reaction rate, allowing acid to penetrate further into the formation or to react more uniformly around the wellbore. The reaction of hydrochloric acid may be retarded by gelling the acid in accordance with the present invention. Additionally, The acid thickened gel of the present invention have been shown to thicken with calcium carbonate up to about 13–17% at which point the gels phase separate causing rapid thinning.

The reaction of acetic acid is naturally retarded because a build up of the reaction product, carbon dioxide, reduces the reaction rate. As carbon dioxide bleeds off into the formation or is absorbed by the oil, water or hydrocarbon gas, the reaction of acetic acid continues.

Conventionally hydrocarbon wells in carbonate reservoirs are acidized immediately after drilling before production commences and often repeat treatments are conducted every two to three years.

The thickened acid gels of the present invention are also useful in matrix fracturing where fractures are created by injecting sand suspended in an aqueous fluid (known as proppant) into a well at a rate above fracture pressure. When the injection pressure is removed, the sand remains in place, propping the fracture open. It is very unusual for a propped fracture subsequently to be treated with hydrochloric acid, since the rapid reaction rate between the acid and the rock may cause collapse of the fracture. However damage may be caused by the filtering out of gels from the proppant suspension on the fracture faces and this can substantially reduce the rate of oil or gas flow into the fracture.

Conventionally oil wells are drilled vertically down into the oil reservoir and through the payzone of the reservoir. Oil flows into the vertical wellbore. In recent years the drilling of wells out from the vertical wellbore in a horizontal direction through the reservoir has become widespread. In many cases horizontal wells have increased hydrocarbon production by several orders of magnitude. The removal of drilling damage caused by accumulation of drilling mud filter cake and fine rock particles from horizontal wells is a very costly process due to the need to use specialist techniques, such as injection of acid through coiled tubing, to avoid corrosion of wellhead equipment and prevent hydrochloric acid being spent before it reaches the far end of the horizontal well. The purpose of an acid treatment or acidizing the formation is to remove formation damage along as much of the hydrocarbon flow path as possible. An effective treatment must therefore remove as much damage as possible along the entire flow path. The fluids and techniques of the present invention allow maximum penetration of the acid resulting in a more effective treatment.

Finally, when a reservoir has been exhausted due to reduction of natural reservoir pressure, water or carbon dioxide gas may be injected to recover a further percentage of the oil-in-place. Water or gas is injected through a proportion of wells in the reservoir (injector wells), thus pushing the oil towards producer wells. In some reservoirs the rate of water injection is low and hence the oil production rate is low. Acid treatments utilizing the acid gels of the present invention can be employed to increase the injectivity of injector wells.

The gelling agents disclosed herein provide several advantages over the polymers (e.g., polysaccharides) currently used as gelling agents for downhole fluids. For example, the compounds set forth herein (particularly the alkyl amidoamine oxide, and more particularly, alkyl amidopropylamine oxide) when used as gelling agents for downhole fluid produce less residue on the formation which could result in formation damage during and after the downhole process.

Also, it is easier to produce the gelled fluid as compared with polymers which typically must be hydrated, and the gelled fluid can be designed to "break" with formation temperatures or other factors such as oxidizers. One can also "break" the gelled fluid by using solvents such as hydrocarbons, alcohols, or even oil from the formation. The gelling agents set forth below are useable over a wide range of temperature depending on chain length, and can assist in removing oil from the formation.

For purposes of selectively modifying the permeability of underground rock formations one or more gelling agent can first be blended with an aqueous acid composition of desired strength to form a thickened acidic viscoelastic fluid which is then injected into the rock formation in an amount effective to modify the permeability of the of the formation. Optionally, the concentration of gelling agent in the acid fluid can be from about 0.5% to about 10%, preferably from about 2% to about 8%, and more preferably from about 4% to about 6% by weight. It is also important that the gelling agent contain less than about 1% free fatty acid and between about 2 and 8% free amine for optimum performance. Use of an alcohol such as isopropanol should be avoided since it destroys the viscoelastic character of the gelling agents of the present invention.

The thickened acid gels of the present invention can also be usefully employed in cleaning and sanitizing formulations, water-based coatings (e.g. paints), detergent formulations, personal care formulations, water-based asphalt systems, concrete, building products, (e.g., motars, plasters, joint compounds, and the like), agricultural drift control agents, in other oil well stimulation and oilfield applications, and the like.

The invention will now be illustrated by the following examples.

EXAMPLE 1

Preparation of the Gelling Agent

Procedure

Charge (8.4 lbs.) of tallowamidopropyldimethylamine (TAPA), (7.0 lb) solvent (propylene glycol or isopropanol) and (1.8 gm) Dequest 2010 to a 3 gallon reactor. Determine the net equivalent weight (NE) of the tallowamidopropylamine. Then charge (70 gm) ammonium bicarbonate. Heat reactor to 50° C. and purge reactor headspace with $N_2$. A 3% molar excess of 70% $H_2O_2$ is then slowly added while maintaining the temperature of the reaction at 55–60° C. Reaction is very exothermic. $H_2O_2$ is then added at ~8.5gm/min (60 minutes minimum addition). Good temperature control is required in order to minimize unwanted byproducts. After $H_2O_2$ addition is complete, the reaction mixture is digested at 55° C. until the free amine is within specifications yielding tallowamidopropylamine oxide gelling agent, hereinafter referred to as Aromox® APA-T. Aromox® APA-T is commercially available from Akzo Nobel Surface Chemistry LLC, Chicago, Ill.

EXAMPLE 2

Use of Aromox® APA-T as an Acid Thickener

A study was conducted to determine the effectiveness of Aromox APA T in acid thickening applications. Hydrochloric acid was chosen as a representative acid and Ethomeen T/12 acetate* was used as a benchmark at high acid strength (15%). Three acid concentrations were used to represent general household cleaners (3%), high strength acid household cleaners (9%) and oilfield acidizing (15%). Aromox APA T was screened at concentrations of 2–8% (as supplied) and at temperatures of 28 and 43° C. The effects of added calcium carbonate were examined for both surfactants at 15% acid strength. All viscosity measurements were taken on a Brookfield viscometer at 0.5 RPM with spindle #52. Aromox APA T Batch: SR302415; Ethomeen T/12 Batch: SR269281X. All concentrations referred to in this report are "as supplied"; Aromox APA T is supplied at ~50% concentration, Ethomeen T/12 is supplied at >97%. Therefore, a 6% Aromox APA T solution contains about the same amount of surfactant (by weight) as a 3% Ethomeen T/12 acetate solution.

Formulation and Stability

The 3% HCl solutions required heating to 40–50° C. to completely solublize the Aromox APA T within one hour. The 9% HCl solutions require similar treatments to achieve solubility for surfactant concentrations greater than 6%. The 15% HCl solutions immediately solubilized surfactant concentrations up to 8% at room temperature. All gels were clear with the exception of the 15% HCl/8% Aromox APA T gel which was slightly yellow. Once in solution, the gels are phase stable upon cooling to room temperature for at least three weeks. Stability tests at room temperature have indicated that after about three weeks, the 9% gels begin to separate in the order of lowest to highest surfactant concentration. The 3% and 15% gels are stable up to about 5–6 weeks, but then phase separate in the order of increasing surfactant. The lower the concentration of surfactant the quicker phase separation occurs within the same acid strength. It is surprising that the 9% HCl gels phase separated quicker than either higher or lower acid concentration.

Comparison of Aromox APA T and Ethomeen T/12 Acetate

As a point of reference, Ethomeen T/12 acetate was screened at 2–8% concentration in 15% HCl solution. Concentrations of surfactant up to 8% were immediately dissolved in the 15% acid solutions at room temperature. All gels were yellow-orange in color and darkened with increased surfactant concentration. As indicated in the Chart 2, the Ethomeen T/12 acetate gels reach a maximum viscosity at roughly 4% concentration. Upon increasing the surfactant load, the gels quickly lose viscosity. This is a major point of differentiation between the Aromox APA T and the Ethomeen T/12 acetate gels. A large difference in acid thickening is noted at surfactant concentrations of 6 and 8%.

Chart 1.
Aromox APA T Acid Thickening - Temperature Dependence

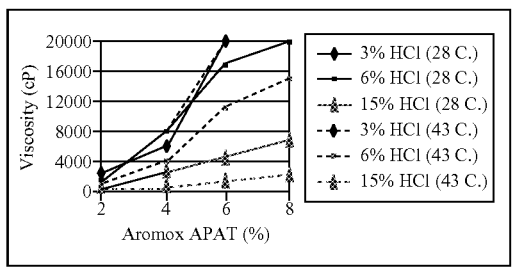

Chart 2.
Comparative Acid Thickening at 15% HCl

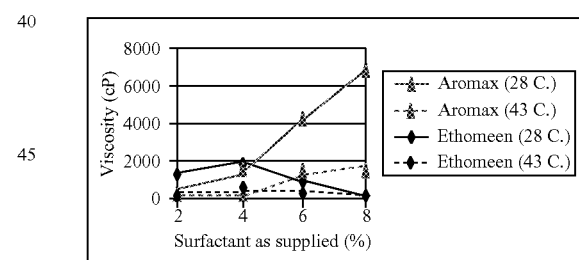

Results and Discussion

Aromox APA T

As shown in Chart 1, the viscosity of Aromox APA T gels increases with surfactant concentration, but decreases with increasing acid strength and/or increasing temperature. At 3% HCl there is relatively little difference in viscosity between 28 and 43° C. At 15% HCl, however, the viscosity decreases more dramatically with temperature. The debilitating effect of increased temperature is exacerbated by increased acid strength. For example, at 6% surfactant strength, the 3% HCl gel does not decrease in viscosity on increasing temperature from 28 to 43° C., whereas at 15% HCl the gel decreases by about 75% in viscosity over the same temperature change.

Effects of Added Calcium Carbonate

When acidizing a well to increase production, much of the limestone (calcite ($CaCO_3$): dolomite ($CaCO_3+MgCO_3$ equimolar) ratio greater than 50%) is dissolved into the acid matrix. To understand how the Aromox APA T and Ethomeen T/12 acetate gels behave under these conditions, a set of experiments was conducted in which calcium carbonate was added to 15% HCl gels. As shown in Chart 3, Aromox APA T thickens to a greater extent than Ethomeen T/12 acetate with added calcium carbonate/decreasing acid concentration at 43° C. Note the viscosity is shown as the log of cP so that the trends can be seen for both gels on the same axis. Both gels phase separate above 13–17% calcium carbonate causing rapid thinning.

Chart 3.
Effect of Added CaCO₃ at 43° C. - Surfactant as supplied

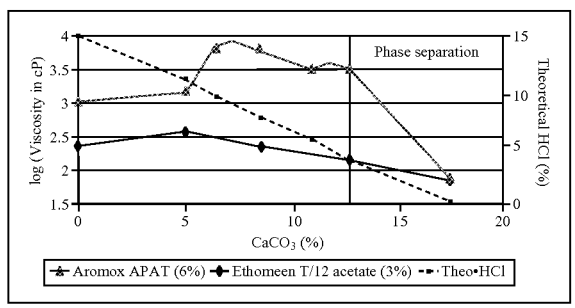

* Added to the 15% HCl solution as a 1:1 (wt/wt) blend with glacial acetic acid.

Aromox APA T is an effective acid thickener. Viscosity increases with surfactant concentration, but decreases with increased acid strength and/or increased temperature. At an acid concentration (HCl) of 15%, Aromox APA T generates greater viscosity than Ethomeen T/12 acetate at equal concentrations of supplied material greater than 4%. The difference in performance is most pronounced at higher concentrations (6–8%) as Ethomeen T/12 acetate reaches a maximum viscosity at around 4% then thins quickly with increased surfactant load. Aromox APA T also thickens to a greater extent than Ethomeen T/12 acetate with added calcium carbonate/decreasing acid concentration. Both gels phase separate at about 13–17% calcium carbonate causing the viscosity to decrease dramatically.

We claim:

1. An aqueous, thickened acid composition which comprises at least one acid selected from the group consisting of hydrochloric, hydrofluoric, acetic, formic, sulfamic, chloroacetic, and mixtures thereof and a gelling agent for said acid, wherein said gelling agent comprises at least one glycol as a solvent, and at least one amidoamine oxide of general formula (I)

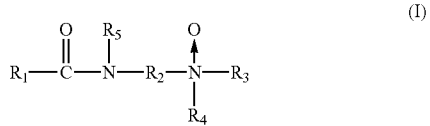

wherein $R_1$ is a saturated or unsaturated, straight or branched chain aliphatic group of from about 7 to about 30 carbon atoms, $R_2$ is a straight or branched chain, saturated or unsaturated divalent alkylene group of from 2 to about 6 carbon atoms, $R_3$ and $R_4$ are the same or different and are alkyl or hydroxyalkyl of from 1 to about 4 carbon atoms, or $R_3$ and $R_4$ together with the nitrogen atom to which they are bonded form a heterocyclic ring of up to 6 members, and $R_5$ is hydrogen or a alkyl or hydroxyalkyl group of from 1 to about 4 carbon atoms, wherein said gelling agent composition contains less than about 10% free fatty acid and from about 2–10% free amine.

2. The thickened composition of claim 1 wherein $R_1$ is an aliphatic group of from about 15 to about 21 carbon atoms, and $R_2$ is an alkylene group of from about 2 to about 4 carbon atom.

3. The thickened composition of claim 1 wherein $R_1$ is an aliphatic group derived from natural fats and oils having an iodine value of from about 1 to about 140, and $R_2$ is an alkylene group having 3 carbon atoms.

4. The thickened composition of claim 1 wherein $R_1$ is selected from the group consisting of tallow alkyl, hardened tallow alkyl, rapeseed alkyl, hardened rapeseed alkyl, tall oil alkyl, hardened tall oil alkyl, coco alkyl, stearyl, oleyl and soya alkyl, $R_2$ is an alkylene group having three carbon atoms, and $R_3$ and $R_4$ are each methyl.

5. The thickened composition of claim 1 wherein $R_3$ and $R_4$ together with the amine nitrogen to which they are bonded form a heterocyclic group having a 5-member ring derived from pyrrolidine.

6. The thickened composition of claim 1 wherein $R_3$ and $R_4$ together with the amine nitrogen to which they are bonded form a heterocyclic group having a 6-member ring derived from piperidine.

7. The thickened composition of claim 1 wherein $R_3$ and $R_4$ together with the amine nitrogen to which they are bonded form a heterocyclic group having a 6-member ring derived from morpholine.

8. The thickened composition of claim 1 wherein said at least one glycol solvent is selected from the group consisting of ethylene glycol, butylene glycols, diethylene glycol, propylene glycols, polyethylene glycol, polypropylene glycol, glycerin, tetramethylene glycol, tetramethylethylene glycol, trimethylene glycol and mixtures thereof.

9. The thickened composition of claim 1 wherein said amidoamine oxide is selected from the group consisting of tallow amidoalkylamine oxide, hardened tallow amidoalkylamine oxide, rapeseed amidoalkylamine oxide, hardened rapeseed amidoalkylamine oxide, tall oil amidoalkylamine oxide, hardened tall oil amidoalkylamine oxide, coco amidoalkylamine oxide, stearyl amidoalkylamine oxide, oleyl amidoalkylamine oxide, soya amidoalkylamine oxide, and mixtures thereof.

10. The thickened composition of claim 1 wherein said amidoamine oxide is selected from the group consisting of tallowamidopropyl dimethylamine oxide, hydrogenated tallowamidopropyl dimethylamine oxide, soya amidopropyl dimethylamine oxide, oleyl amidopropyl dimethylamine oxide, erucyl amidopropyl dimethylamine oxide, rapeseed amidopropyl dimethylamine oxide, hydrogenated rapeseed amidopropyl dimethylamine oxide, tall oil amidopropyl dimethylamine oxide, hydrogenated tall oil amidopropyl dimethylamine oxide, $C_{14}$–$C_{22}$ saturated or unsaturated fatty acid amidopropyl dimethylamine oxides, and mixtures thereof.

11. The thickened composition of claim 1 wherein said amidoamine oxide is selected from the group consisting of tallowamidopropyl dimethylamine oxide, hydrogenated tallowamidopropyl dimethylamine oxide, soya amidopropyl dimethylamine oxide, oleyl amidopropyl dimethylamine oxide, erucyl amidopropyl dimethylamine oxide, rapeseed amidopropyl dimethylamine oxide, hydrogenated rapeseed amidopropyl dimethylamine oxide, tall oil amidopropyl dimethylamine oxide, hydrogenated tall oil amidopropyl dimethylamine oxide, $C_{14}$–$C_{22}$ saturated or unsaturated fatty acid amidopropyl dimethylamine oxides, and mixtures thereof, and said glycol is selected from the group consisting of ethylene glycol, butylene glycols, diethylene glycol, propylene glycols, polyethylene glycol, polypropylene glycol, glycerin, tetramethylene glycol, tetramethylethylene glycol, trimethylene glycol and mixtures thereof.

12. A method for thickening an aqueous acid mixture which comprises adding to said mixture an acid thickening effective amount of at least one gelling agent composition wherein said gelling agent composition comprises at least one glycol and at least one amidoamine oxide of the formula:

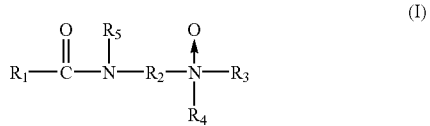

wherein $R_1$ is a saturated or unsaturated, straight or branched chain aliphatic group of from about 7 to about 30 carbon atoms, $R_2$ is a straight or branched chain, saturated or unsaturated divalent alkylene group of from 2 to about 6 carbon atoms, $R_3$ and $R_4$ are the same or different and are alkyl or hydroxyalkyl of from 1 to about 4 carbon atoms, or $R_3$ and $R_4$ together with the nitrogen atom to which they are bonded form a heterocyclic ring of up to 6 members, and $R_5$ is hydrogen or a alkyl or hydroxyalkyl group of from 1 to about 4 carbon atoms, wherein said gelling agent composition contains less than about 10% free fatty acid, and from 2–10% free amine, wherein said aqueous acid mixture comprises an acid is selected from the group consisting of hydrochloric, hydrofluoric, acetic, formic, sulfamic, chloroacetic, and mixtures thereof.

13. The method of claim 12 wherein $R_1$ is an aliphatic group of from about 15 to about 21 carbon atoms, and $R_2$ is an alkylene group of from about 2 to about 4 carbon atom.

14. The method of claim 13 wherein $R_1$ is selected from the group consisting of tallow alkyl, hardened tallow alkyl, rapeseed alkyl, hardened rapeseed alkyl, tall oil alkyl, hardened tall oil alkyl, coco alkyl, stearyl, oleyl and soya alkyl, $R_2$ is an alkylene group having three carbon atoms, and $R_3$ and $R_4$ are each methyl.

15. The method of claim 12 wherein $R_3$ and $R_4$ together with the amine nitrogen to which they are bonded form a heterocyclic ring of up to 6 members derived from a pyrrolidine, a piperidine or a morpholine.

16. The method of claim 12 wherein said at least one glycol solvent is selected from the group consisting of ethylene glycol, butylene glycols, diethylene glycol, propylene glycols, polyethylene glycol, polypropylene glycol, glycerin, tetramethylene glycol, tetramethylethylene glycol, trimethylene glycol and mixtures thereof.

17. The method of claim 12 wherein said amidoamine oxide is selected from the group consisting of tallow amidoalkylamine oxide, hardened tallow amidoalkylamine oxide, rapeseed amidoalkylamine oxide, hardened rapeseed amidoalkylamine oxide, tall oil amidoalkylamine oxide, hardened tall oil amidoalkylamine oxide, coco amidoalkylamine oxide, stearyl amidoalkylamine oxide, oleyl amidoalkylamine oxide, soya amidoalkylamine oxide, and mixtures thereof.

18. The method of claim 17 wherein said amidoamine oxide is selected from the group consisting of tallowamidopropyl dimethylamine oxide, hydrogenated tallowamidopropyl dimethylamine oxide, soya amidopropyl dimethylamine oxide, oleyl amidopropyl dimethylamine oxide, erucyl amidopropyl dimethylamine oxide, rapeseed amidopropyl dimethylamine oxide, hydrogenated rapeseed amidopropyl dimethylamine oxide, tall oil amidopropyl dimethylamine oxide, hydrogenated tall oil amidopropyl dimethylamine oxide, $C_{14}$–$C_{22}$ saturated or unsaturated fatty acid amidopropyl dimethylamine oxides, and mixtures thereof.

19. The method of claim 18 wherein said amidoamine oxide is selected from the group consisting of tallowamidopropyl dimethylamine oxide, hydrogenated tallowamidopropyl dimethylamine oxide, soya amidopropyl dimethylamine oxide, oleyl amidopropyl dimethylamine oxide, erucyl amidopropyl dimethylamine oxide, rapeseed amidopropyl dimethylamine oxide, hydrogenated rapeseed amidopropyl dimethylamine oxide, tall oil amidopropyl dimethylamine oxide, hydrogenated tall oil amidopropyl dimethylamine oxide, $C_{14}$–$C_{22}$ saturated or unsaturated fatty acid amidopropyl dimethylamine oxides, and mixtures thereof, and said glycol is selected from the group consisting of ethylene glycol, butylene glycols, diethylene glycol, propylene glycols, polyethylene glycol, polypropylene glycol, glycerin, tetramethylene glycol, tetramethylethylene glycol, trimethylene glycol and mixtures thereof.

20. A well stimulation fluid which comprises the thickened composition of claim 1.

21. The well stimulation fluid of claim 20 wherein said fluid is a matrix acidizing fluid, a completion acidizing fluid, a fracture acidizing fluid, or a damage removal acidizing fluid.

22. A method of acidizing an underground formation comprising a reservoir, which comprises injecting the thickened acid composition of claim 1 into said reservoir.

23. The method of claim 22 wherein said reservoir is a hydrocarbon reservoir or a water reservoir.

24. The method of claim 23 wherein said hydrocarbon is oil or gas.

25. The method of claim 22 wherein said thickened composition is injected at a rate at or above the reservoir fracture pressure.

26. The method of claim 22 wherein said thickened composition is injected at a rate below the reservoir fracture pressure.

27. The method of claim 12 when carried out with a fracturing or matrix treatment.

28. The thickened acid composition of claim 1 wherein said gelling agent composition contains less than about 5% free fatty acid.

29. The method of claim 12 wherein said gelling agent composition contains less than about 5% free fatty acid.

* * * * *